United States Patent
Dipol et al.

(10) Patent No.: US 9,697,052 B2
(45) Date of Patent: Jul. 4, 2017

(54) SYSTEM AND METHOD FOR PARTITION TEMPLATES IN A MULTITENANT APPLICATION SERVER ENVIRONMENT

(71) Applicant: ORACLE INTERNATIONAL CORPORATION, Redwood Shores, CA (US)

(72) Inventors: Joseph Dipol, Sunnyvale, CA (US); Martin Mares, Prague (CZ); Nazrul Islam, Santa Clara, CA (US); Romain Grecourt, Prague (CZ); Jennifer Galloway, San Francisco, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 14/748,142

(22) Filed: Jun. 23, 2015

(65) Prior Publication Data

US 2015/0370608 A1    Dec. 24, 2015

Related U.S. Application Data

(60) Provisional application No. 62/016,043, filed on Jun. 23, 2014, provisional application No. 62/054,907, filed on Sep. 24, 2014.

(51) Int. Cl.
*G06F 9/46* (2006.01)
*G06F 9/50* (2006.01)
(Continued)

(52) U.S. Cl.
CPC .......... *G06F 9/5077* (2013.01); *H04L 47/783* (2013.01); *H04L 67/1025* (2013.01); *H04L 67/42* (2013.01)

(58) Field of Classification Search
USPC ............................................. 718/1, 100–108
See application file for complete search history.

(56) References Cited

U.S. PATENT DOCUMENTS

| | | | |
|---|---|---|---|
| 6,247,109 B1 * | 6/2001 | Kleinsorge | G06F 9/461 |
| | | | 711/153 |
| 6,542,926 B2 * | 4/2003 | Zalewski | G06F 9/5077 |
| | | | 709/213 |

(Continued)

OTHER PUBLICATIONS

Tatsubori et al, "HTML Templates that Fly", ACM, pp. 951-960, 2009.*

(Continued)

*Primary Examiner* — Anil Khatri
(74) *Attorney, Agent, or Firm* — Tucker Ellis LLP

(57) ABSTRACT

In accordance with an embodiment, described herein is a system and method for supporting the use of partition templates in a multitenant application server environment. A partition template, including a partition configurator and/or attributes, can be used to configure partitions deployed to a domain using that partition template. When a request is received to create a new partition, a selected partition template is determined. The partition configurator of that partition template is then used to configure and deploy the partition to the domain at a corresponding virtual target, which in turn is associated with a target system (e.g., a computer server, or a cluster). A plurality of partition templates can be provided, wherein each partition template can include its own partition configurator and/or attributes that can be used to configure partitions deployed to the domain using that partition template, including different configuration attributes for each partition template.

17 Claims, 8 Drawing Sheets

(51) Int. Cl.
*H04L 12/911* (2013.01)
*H04L 29/08* (2006.01)
*H04L 29/06* (2006.01)

(56) References Cited

U.S. PATENT DOCUMENTS

| | | | | |
|---|---|---|---|---|
| 6,980,980 | B1 * | 12/2005 | Yeh | G06F 17/30395 |
| 7,590,984 | B2 * | 9/2009 | Kaufman | G06F 9/5066 |
| | | | | 718/105 |
| 7,725,559 | B2 * | 5/2010 | Landis | G06F 9/5016 |
| | | | | 709/215 |
| 7,926,060 | B2 * | 4/2011 | Klingman | G06F 9/505 |
| | | | | 718/104 |
| 8,234,650 | B1 * | 7/2012 | Eppstein | G06F 9/5072 |
| | | | | 709/220 |
| 8,458,717 | B1 * | 6/2013 | Keagy | G06F 8/63 |
| | | | | 718/104 |
| 8,495,067 | B2 * | 7/2013 | Ripberger | H04L 67/1097 |
| | | | | 707/641 |
| 8,656,386 | B1 * | 2/2014 | Baimetov | G06F 9/45558 |
| | | | | 709/219 |
| 8,671,404 | B2 * | 3/2014 | DeHaan | G06F 8/60 |
| | | | | 709/223 |
| 8,898,668 | B1 * | 11/2014 | Costea | G06F 9/45558 |
| | | | | 709/203 |
| 8,959,523 | B2 * | 2/2015 | Patil | G06F 9/45558 |
| | | | | 709/220 |
| 2012/0150912 | A1 | 6/2012 | Ripberger | |
| 2013/0212576 | A1 | 8/2013 | Huang | |
| 2013/0232498 | A1 | 9/2013 | Mangtani | |

OTHER PUBLICATIONS

Sørensen et al, "Reuse and Combination with Package Templates", ACM, pp. 1-5, 2010.*

Porter et al, "Partition Configuration for Real-Time Systems With Dependencies ", ACM, pp. 87-96-2013.*

Barreiros et al, "A Cover-Based Approach for Configuration Repair", ACM, pp. 157-167, 2014.*

Leibert et al, "Automatic Management of Partitioned, Replicated Search Services ", ACM, pp. 1-8, 2011.*

Ambrosio et al,"Configuration Level Hardware/Software Partitioining for Real Time Embedded Systems", IEEE, pp. 34-41, 1994.*

United States Patent and Trademark Office, Office Action Dated Jan. 23, 2017 for U.S. Appl. No. 14/748,146, 12 Pages.

* cited by examiner

SYSTEM AND METHOD FOR PARTITION TEMPLATES IN A MULTITENANT APPLICATION SERVER ENVIRONMENT

CLAIM OF PRIORITY AND CROSS-REFERENCE TO RELATED APPLICATIONS

This application claims the benefit of priority to U.S. Provisional Application titled "SYSTEM AND METHOD FOR PARTITION TEMPLATES AND TIERED PARTITIONS IN A MULTITENANT APPLICATION SERVER ENVIRONMENT", Application No. 62/016,043, filed Jun. 23, 2014; and U.S. Provisional Application titled "SYSTEM AND METHOD FOR PARTITION TEMPLATES AND CONFIGURATION TAGGING IN A MULTITENANT APPLICATION SERVER ENVIRONMENT", Application No. 62/054,907, filed Sep. 24, 2014; and is related to U.S. Patent Application titled "SYSTEM AND METHOD FOR SUPPORTING MULTI-TENANCY IN AN APPLICATION SERVER, CLOUD, OR OTHER ENVIRONMENT", application Ser. No. 14/601,883, filed Jan. 21, 2015; each of which above applications are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to application servers and cloud environments, and are particularly related to a system and method for supporting use of partition templates and configuration tagging in a multitenant application server environment.

BACKGROUND

Application servers generally provide a managed environment within which software applications can be deployed and run. Cloud-based environments allow applications to run within and take advantage of the distributed resources provided by a cloud. Such environments can support large numbers of users or tenants, some of which may have specific requirements that are particular to that user or tenant. These are some examples of the type of environments in which embodiments of the present invention can be used.

SUMMARY

In accordance with an embodiment, described herein is a system and method for supporting the use of partition templates in a multitenant application server environment. In accordance with an embodiment, a partition template, including a partition configurator and/or attributes, can be used to configure partitions deployed to a domain using that partition template. When a request is received to create a new partition, a selected partition template is determined. The partition configurator of that partition template is then used to configure and deploy the partition to the domain at a corresponding virtual target, which in turn is associated with a target system (e.g., a computer server, or a cluster). A plurality of partition templates can be provided, wherein each partition template can include its own partition configurator and/or attributes that can be used to configure partitions deployed to the domain using that partition template, including different configuration attributes for each partition template.

DETAILED DESCRIPTION

In accordance with an embodiment, described herein is a system and method for supporting the use of partition templates in a multitenant application server environment. In accordance with an embodiment, a partition template, including a partition configurator and/or attributes, can be used to configure partitions deployed to a domain using that partition template. When a request is received to create a new partition, a selected partition template is determined. The partition configurator of that partition template is then used to configure and deploy the partition to the domain at a corresponding virtual target, which in turn is associated with a target system (e.g., a computer server, or a cluster). A plurality of partition templates can be provided, wherein each partition template can include its own partition configurator and/or attributes that can be used to configure partitions deployed to the domain using that partition template, including different configuration attributes for each partition template.

Application Server (e.g., Multi-Tenant, MT) Environment

Figure 1:
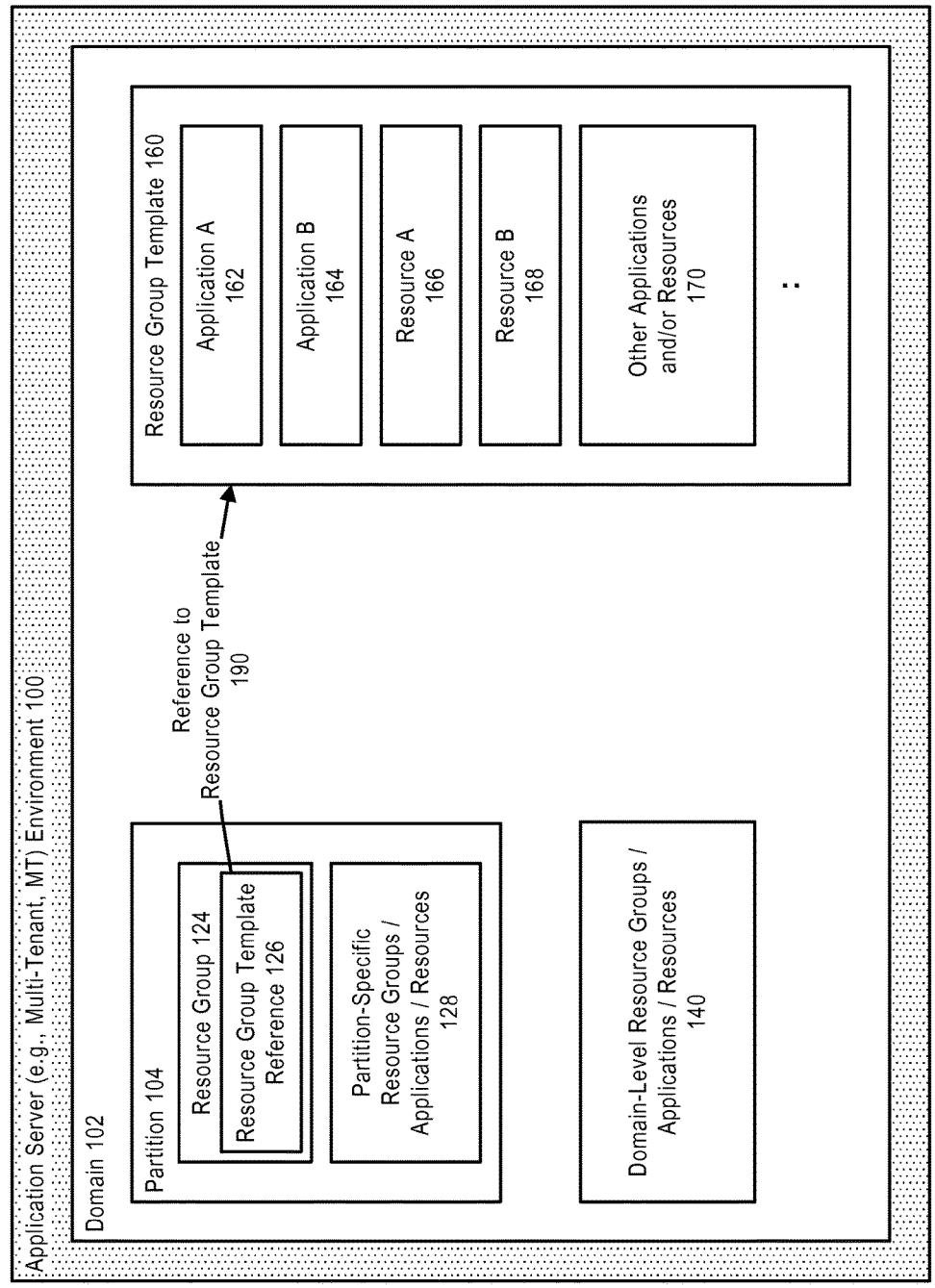
FIG. 1 illustrates a system for supporting multi-tenancy in an application server, cloud, or other environment, in accordance with an embodiment.

FIG. 1 illustrates a system for supporting multi-tenancy in an application server, cloud, or other environment, in accordance with an embodiment.

As illustrated in FIG. 1, in accordance with an embodiment, an application server (e.g., multi-tenant, MT) environment 100, or other computing environment which enables the deployment and execution of software applications, can be configured to include and operate according to a domain 102 configuration that is used at runtime to define an application server domain.

In accordance with an embodiment, the application server can include one or more partitions 104 that are defined for use at runtime. Each partition can be associated with a globally unique partition identifier (ID) and partition configuration, and can further include one or more resource groups 124, together with a reference to a resource group template 126 and/or partition-specific applications or resources 128. Domain-level resource groups, applications and/or resources 140 can also be defined at the domain level, optionally with a reference to a resource group template.

Each resource group template 160 can define one or more applications A 162, B 164, resources A 166, B 168, and/or other deployable applications or resources 170, and can be referenced by a resource group. For example, as illustrated in FIG. 1, resource group 124 in partition 104 can reference 190 resource group template 160.

Generally, a system administrator can define partitions, domain-level resource groups and resource group templates, and security realms; while a partition administrator can define aspects of their own partition, for example, by creating partition-level resource groups, deploying applications to the partition, or referencing specific realms for the partition.

Figure 2:
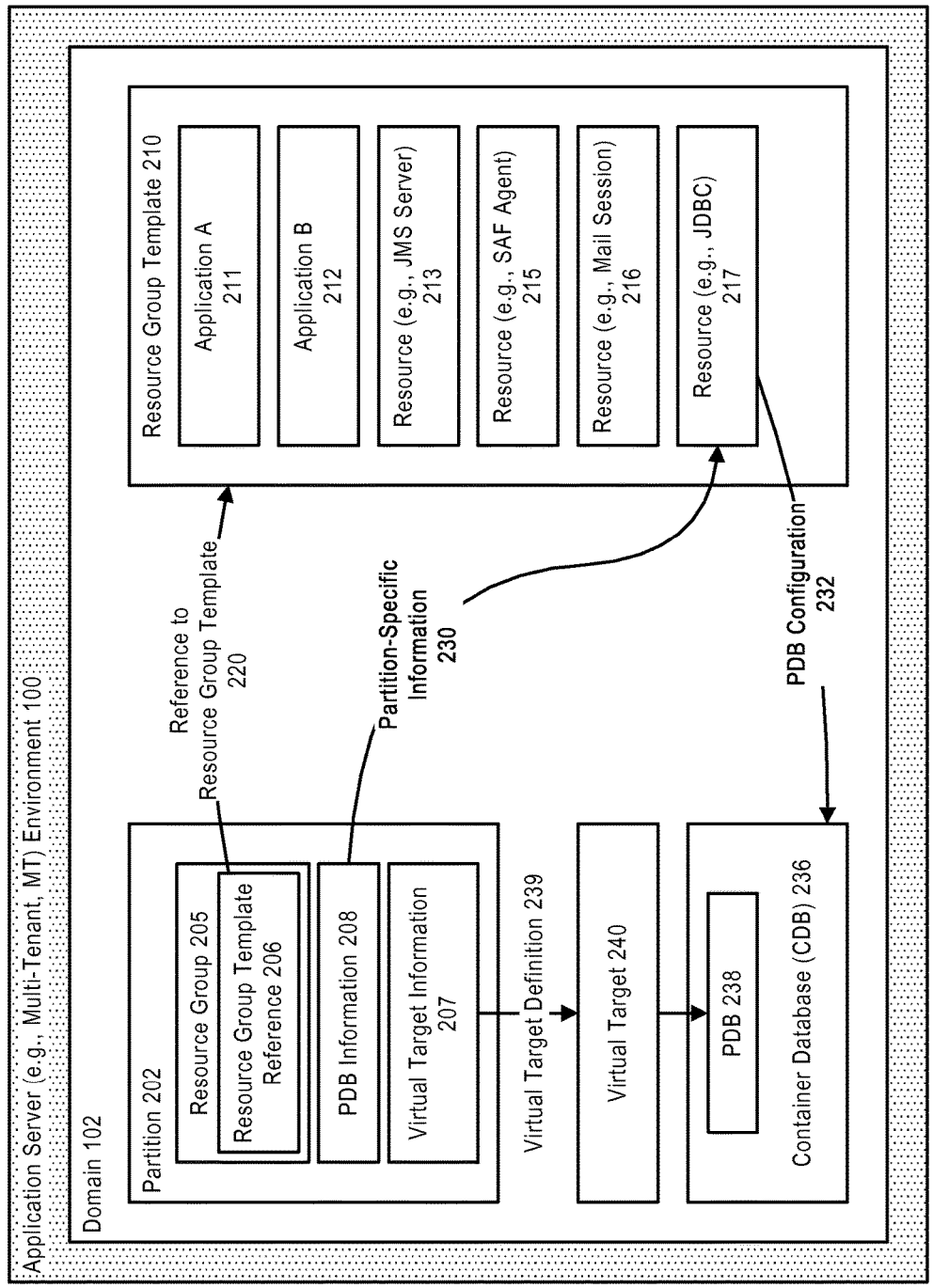
FIG. 2 further illustrates a system for supporting multi-tenancy in an application server, cloud, or other environment, in accordance with an embodiment.

FIG. 2 further illustrates a system for supporting multi-tenancy in an application server, cloud, or other environment, in accordance with an embodiment.

As illustrated in FIG. 2, in accordance with an embodiment, a partition 202 can include, for example, a resource group 205 which includes a reference 206 to a resource group template 210, a virtual target (e.g., virtual host) information 207, and a pluggable database (PDB) information 208. A resource group template (e.g., 210) can define, for example, a plurality of applications A 211 and B 212, together with resources such as a Java Message Server (JMS) server 213, store-and-forward (SAF) agent 215, mail session component 216, or Java Database Connectivity (JDBC) resource 217.

The resource group template illustrated in FIG. 2 is provided by way of example; in accordance with other embodiments, different types of resource group templates and elements can be provided.

In accordance with an embodiment, when a resource group within a partition (e.g., 202) references 220 a particular resource group template (e.g., 210), information associated with a particular partition can be used in combination with the referenced resource group template, to indicate a partition-specific information 230, for example a partition-specific PDB information. The partition-specific information can then be used by the application server to configure resources, for example a PDB resource, for use by the partition. For example, partition-specific PDB information associated with partition 202 can be used, by the application server, to configure 232 a container database (CDB) 236 with an appropriate PDB 238, for use by that partition.

Similarly, in accordance with an embodiment, a virtual target information associated with a particular partition can be used to define 239 a partition-specific virtual target 240, for use by the partition, e.g., baylandurgentcare.com, which can then be made accessible via a uniform resource locator (URL), e.g., http://baylandurgentcare.com.

Figure 3:
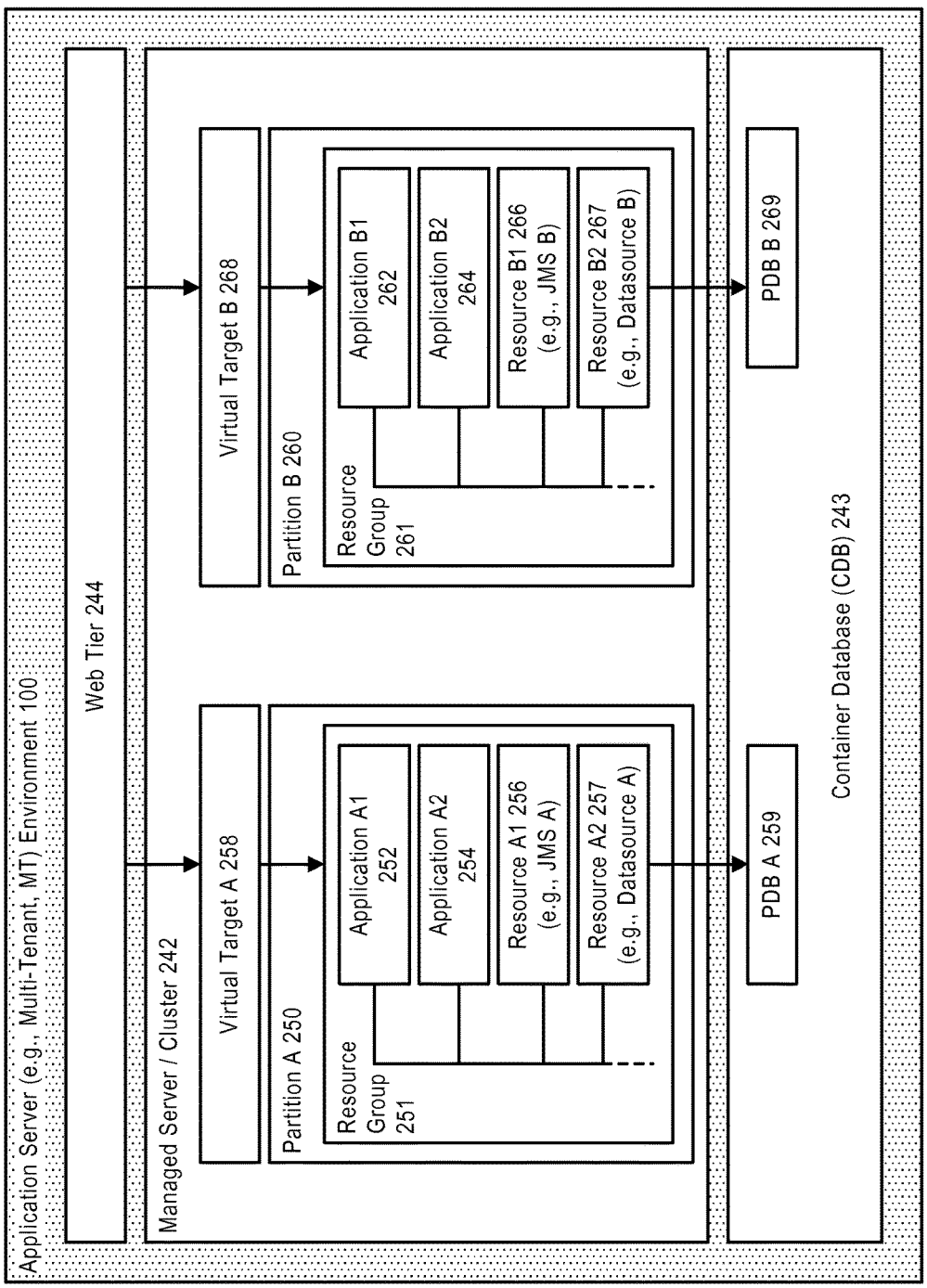
FIG. 3 further illustrates a system for supporting multi-tenancy in an application server, cloud, or other environment, in accordance with an embodiment.

FIG. 3 further illustrates a system for supporting multi-tenancy in an application server, cloud, or other environment, in accordance with an embodiment.

In accordance with an embodiment, a system configuration such as a config.xml configuration file, is used to define a partition, including configuration elements for resource groups associated with that partition, and/or other partition properties. Values can be specified per-partition using property name/value pairs.

In accordance with an embodiment, a plurality of partitions can be executed within a managed server/cluster 242, or a similar environment which can provide access to a CDB 243, and which are accessible via a web tier 244. This allows, for example, a domain or partition to be associated with one or more of the PDBs (of the CDB).

In accordance with an embodiment, each of the plurality of partitions, in this example partition A 250 and partition B 260, can be configured to include a plurality of resources associated with that partition. For example, partition A can be configured to include a resource group 251 which contains an application A1 252, application A2 254, and JMS A 256, together with a datasource A 257 associated with PDB A 259, wherein the partition is accessible via a virtual target A 258. Similarly, partition B 260 can be configured to include a resource group 261 which contains an application B1 262, application B2 264, and JMS B 266, together with a datasource B 267 associated with PDB B 269, wherein the partition is accessible via a virtual target B 268.

While several of the above examples illustrate use of CDB and PDBs, in accordance with other embodiments, other types of multi-tenant or non-multi-tenant databases can be supported, wherein a particular configuration can be provided for each partition, for example through the use of schemas, or the use of different databases.

Resources

In accordance with an embodiment, a resource is a system resource, application, or other resource or object that can be deployed to a domain of the environment. For example, in accordance with an embodiment, a resource can be an application, JMS, JDBC, JavaMail, WLDF, data source, or other system resource or other type of object that can be deployed to a server, cluster, or other application server target.

Partitions

In accordance with an embodiment, a partition is a runtime and administrative subdivision or slice of a domain that can be associated with a partition identifier (ID) and configuration, and can contain applications and/or refer to domain-wide resources through the use of resource groups and resource group templates.

Generally, a partition can contain its own applications, refer to domain wide applications via resource group templates, and have its own configuration. Partitionable entities can include resources, for example JMS, JDBC, JavaMail, WLDF resources, and other components, such as JNDI namespace, network traffic, work managers, and security policies and realms. In the context of a multi-tenant environment, the system can be configured to provide tenant access to the administrative and runtime aspects of partitions associated with a tenant.

In accordance with an embodiment, each resource group within a partition can optionally reference a resource group template. A partition can have multiple resource groups, and each of them can reference a resource group template. Each partition can define properties for configuration data that is not specified in the resource group templates to which the partition's resource groups refer. This enables the partition to act as a binding of deployable resources defined in a resource group template, to specific values for use with that partition. In some cases, a partition can override configuration information specified by a resource group template.

In accordance with an embodiment, a partition configuration, as defined for example by a config.xml configuration file, can include a plurality of configuration elements, for example: "partition", which contains the attributes and child elements that define the partition; "resource-group", which contains the applications and resources deployed to the partition; "resource-group-template", which contains applications and resources defined by that template; "jdbc-system-resource-override", which contains a database-specific service name, user name, and password; and "partition-properties", which contains property key values that can be used for macro replacement in resource group templates.

Upon startup, the system can use the information provided by the configuration file to generate partition-specific configuration elements for each resource, from the resource group template.

Resource Groups

In accordance with an embodiment, a resource group is a named, fully-qualified collection of deployable resources that can be defined either at a domain or partition level, and can reference a resource group template. The resources in a resource group are considered fully-qualified in that the administrator has provided all of the information needed to start or connect to those resources, for example the credentials for connecting to a data source, or the targeting information for an application.

A system administrator can declare resource groups at the domain level, or at the partition level. At the domain level, a resource group provides a convenient way to group related resources. The system can manage resources declared in a domain-level resource group the same as ungrouped resources, so that the resources can be started during system start-up, and stopped during system shut-down. An administrator can also stop, start, or remove a resource in a group individually, and can act on all the resources in a group implicitly by operating on the group. For example, stopping a resource group stops all of the resources in the group that are not already stopped; starting the resource group starts any resources in the group that are not already started; and removing the resource group removes all of the resources contained in the group.

At the partition level, a system or partition administrator can configure zero or more resource groups in a partition, subject to any security restrictions. For example, in a SaaS use case, various partition-level resource groups can refer to domain-level resource group templates; while in a PaaS use case, partition-level resource groups can be created that do not refer to resource group templates, but instead represent applications and their related resources that are to be made available within that partition only.

In accordance with an embodiment, resource grouping can be used to group together applications and the resources they use as a distinct administrative unit within the domain. For example, in the medical records (MedRec) application described below, a resource grouping defines the MedRec application and its resources. Multiple partitions can run the same MedRec resource group, each using a partition-specific configuration information, such that the applications that are part of each MedRec instance are made specific to each partition.

Resource Group Templates

In accordance with an embodiment, a resource group template is a collection of deployable resources that are defined at a domain level, that can be referenced from a resource group, and some of the information required to activate its resources may not be stored as part of the template itself, such that it supports the specification of partition level configuration. A domain can contain any number of resource group templates, each of which can include, for example, one or more related Java applications and the resources on which those applications depend. Some of the information about such resources may be the same across all partitions, while other information may vary from one partition to the next. Not all configuration need be specified at the domain level—partition level configuration can instead be specified in the resource group template through the use of macros, or property name/value pairs.

In accordance with an embodiment, a particular resource group template can be referenced by one or more resource groups. Generally, within any given partition, a resource group template can be referenced by one resource group at a time, i.e., not simultaneously by multiple resource groups within the same partition; however, it can be referenced at the same time by another resource group in a different partition. The object containing the resource group, e.g., the domain or partition, can use property name/value assignments to set the value of any tokens in the resource group template. When the system activates a resource group template using a referencing resource group, it can replace those tokens with values set in the resource group's containing object. In some cases, the system can also use statically-configured resource group templates and partitions to generate runtime configuration for each partition/template combination.

For example, in a SaaS use case, the system can activate the same applications and resources multiple times, including once for each partition that will use them. When an administrator defines a resource group template they can use tokens to represent the information that will be supplied elsewhere. For example, the username to use in connecting to a CRM-related data resource can be indicated in the resource group template as \${CRMDataUsername}.

Tenants

In accordance with an embodiment, in a multi-tenant environment, such as a multi-tenant (MT) application server environment, a tenant is an entity that can be represented by, or otherwise associated with, one or more partitions and/or one or more tenant-aware applications.

For example, tenants can represent distinct user organizations, such as different external companies, or different departments within a particular enterprise (e.g., HR and Finance departments), each of which can be associated with a different partition. A tenant globally unique identity (tenant ID) is the association of a particular user, at a particular moment in time, with a particular tenant. The system can derive which tenant a particular user belongs to from the user identity, for example by referring to a user identity store. The user identity enables the system to enforce those actions that a user is authorized to perform, including, but not limited to, which tenant the user may belong.

In accordance with an embodiment, the system enables isolation of the administration and runtime of different tenants from each other. For example, tenants can configure some behaviors of their applications, and resources to which they have access. The system can ensure that a particular tenant cannot administer artifacts belonging to another tenant; and, at runtime, that the applications working on behalf of a particular tenant refer only to resources associated with that tenant, and not to resources associated with other tenants.

In accordance with an embodiment, a tenant-unaware application is one that contains no logic dealing with tenants explicitly, such that any resources that the application uses may be accessible regardless of what user submitted a request to which the application is responding. In contrast, a tenant-aware application includes logic that explicitly deals with tenants. For example, based on a user's identity the application can derive the tenant to which the user belongs and use that information to access tenant-specific resources.

In accordance with an embodiment, the system enables users to deploy applications that are explicitly written to be tenant-aware, so that application developers can obtain the tenant ID of a current tenant. The tenant-aware application can then use the tenant ID to handle multiple tenants that are using a single instance of the application.

For example, the MedRec application, which supports a single doctor's office or hospital, can be exposed to two different partitions or tenants, e.g., a Bayland Urgent Care tenant, and a Valley Health tenant, each of which is able to access separate tenant-specific resources, such as separate PDBs, without changing the underlying application code.

Exemplary Domain Configuration and Multi-Tenant Environment

In accordance with an embodiment, applications can be deployed to a resource group template at the domain level, or to a resource group that is scoped to a partition or scoped to the domain. Application configuration can be overridden using deployment plans specified per-application, or per-partition. Deployment plans can also be specified as part of a resource group.

Figure 4:
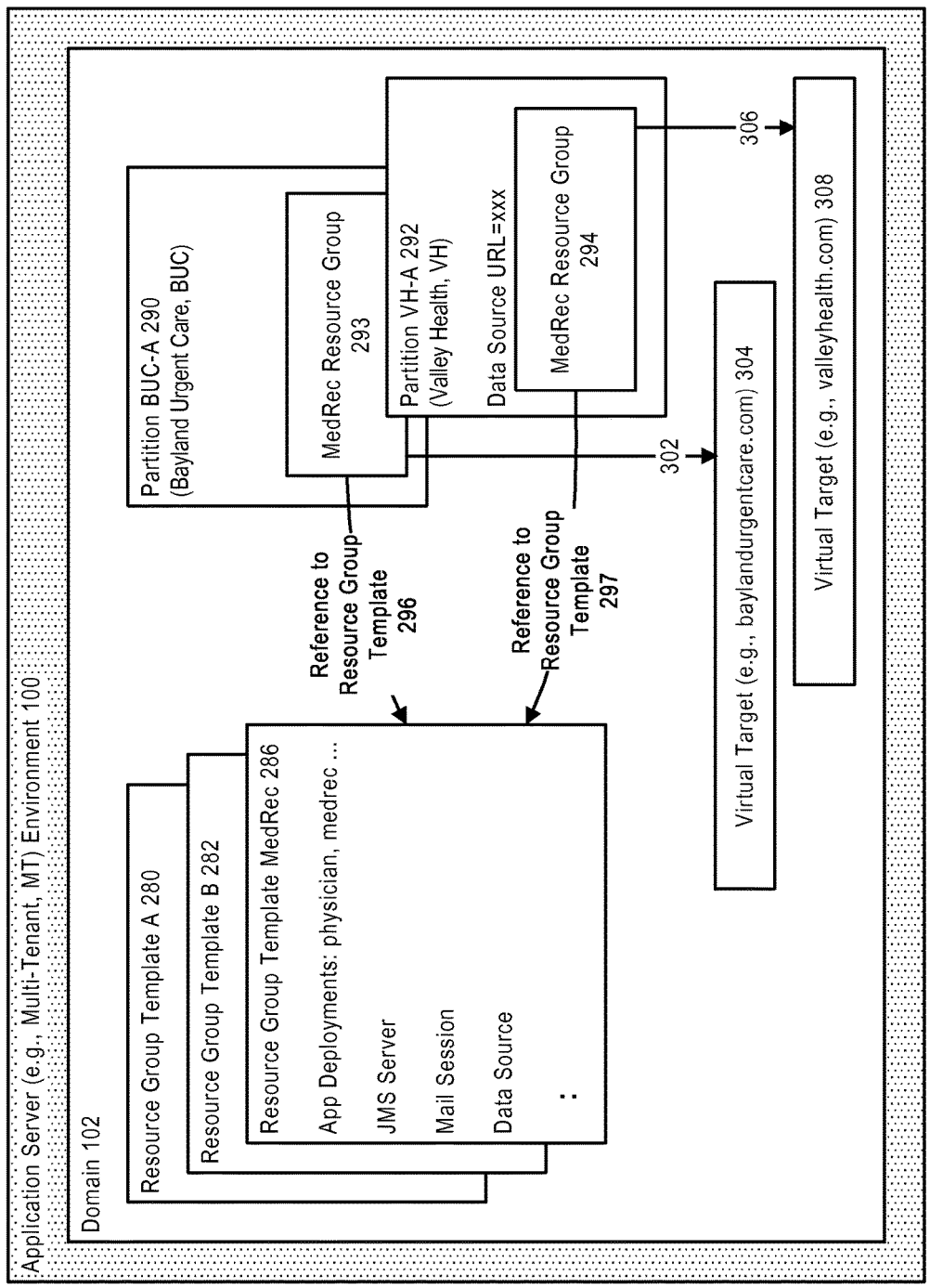
FIG. 4 illustrates a domain configuration for use with an exemplary multi-tenant environment, in accordance with an embodiment.

FIG. 4 illustrates a domain configuration for use with an exemplary multi-tenant environment, in accordance with an embodiment.

In accordance with an embodiment, when the system starts a partition, it creates virtual targets (e.g., virtual hosts) and connection pools, including one for each partition, to respective database instances, according to the provided configuration.

Typically, each resource group template can include one or more related applications and the resources on which those applications depend. Each partition can provide configuration data that is not specified in the resource group templates to which it refers, by providing a binding of the deployable resources in resource group templates to specific values associated with the partition; including, in some cases, overriding certain configuration information specified by the resource group template. This enables the system to activate an application represented by a resource group template differently for each partition, using the property values each partition has defined.

In some instances, a partition may contain resource groups that do not refer to resource group templates, or that directly define their own partition-scoped deployable resources. Applications and data sources that are defined within a partition are generally available only to that partition. Resources can be deployed so that they can be accessed from across partitions using partition:<partitionName>/<resource JNDI name>, or domain:<resource JNDI name>.

For example, a MedRec application can include a plurality of Java applications, a data source, a JMS server, and a mail session. To run the MedRec application for multiple tenants, the system administrator can define a single MedRec resource group template 286, declaring those deployable resources in the template.

In contrast to domain-level deployable resources, the deployable resources declared in a resource group template may not be fully configured in the template, or cannot be activated as-is, since they lack some configuration information.

For example, the MedRec resource group template may declare a data source used by the applications, but it may not specify a URL for connecting to the database. Partitions associated with different tenants, for example, partition BUC-A 290 (Bayland Urgent Care, BUC) and partition VH-A 292 (Valley Health, VH) can reference one or more resource group templates, by each including a MedRec resource group 293, 294 that references 296, 297 the MedRec resource group template. The reference can then be used to create 302, 306, the virtual targets/virtual hosts for each tenant, including a virtual host baylandurgentcare.com 304 associated with the BUC-A partition, for use by the Bayland Urgent Care tenant; and a virtual host valleyhealth.com 308 associated with the VH-A partition, for use by the Valley Health tenant.

Figure 5:
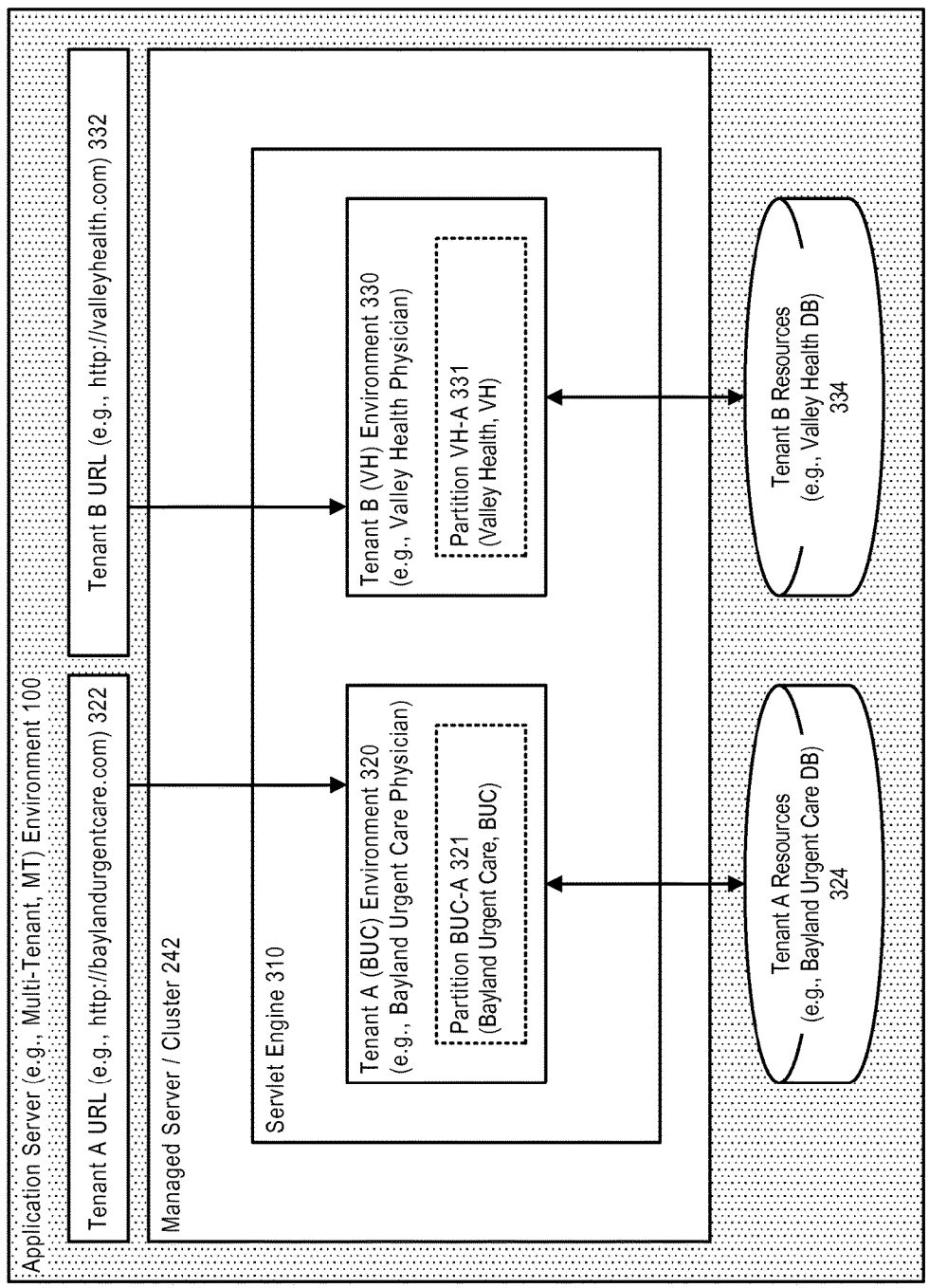
FIG. 5 further illustrates an exemplary multi-tenant environment, in accordance with an embodiment.

FIG. 5 further illustrates an exemplary multi-tenant environment, in accordance with an embodiment. As illustrated in FIG. 5, and continuing the example from above, in which two partitions reference the MedRec resource group template, in accordance with an embodiment, a servlet engine 310 can be used to support a plurality of tenant environments, in this example a Bayland Urgent Care Physician tenant environment 320, and a Valley Health Physician tenant environment 330.

In accordance with an embodiment, each partition 321, 331 can define a different virtual target on which to accept incoming traffic for that tenant environment, and a different URL 322, 332 for connecting to the partition and to its resources 324, 334, including in this example either a bayland urgent care database, or a valley health database respectively. The database instances can use compatible schemas, since the same application code will execute against both databases. When the system starts the partitions, it can create the virtual targets and connection pools to the respective database instances.

Partition Templates

In accordance with an embodiment, a partition template, including a partition configurator and/or attributes, can be used to configure partitions deployed to a domain using that partition template. When a request is received to create a new partition, a selected partition template is determined. The partition configurator of that partition template is then used to configure and deploy the partition to the domain at a corresponding virtual target, which in turn is associated with a target system (e.g., a computer server, or a cluster). A plurality of partition templates can be provided, wherein each partition template can include its own partition configurator and/or attributes that can be used to configure partitions deployed to the domain using that partition template, including different configuration attributes for each partition template.

In accordance with an embodiment, a partition configurator can be implemented as software code that is run when a partition is created from a partition template, and can then modify the configuration of that newly created partition. Additional/new configurators can be written and plugged into the system. A partition template can define the configurators that are to be run when a partition is created from the partition template.

In this manner, a partition template can be considered a snapshot of a partition configuration that can then be made further use of, for example to create or define other partitions, in the manner of stamping copies of active partitions from a master copy.

Figure 6:
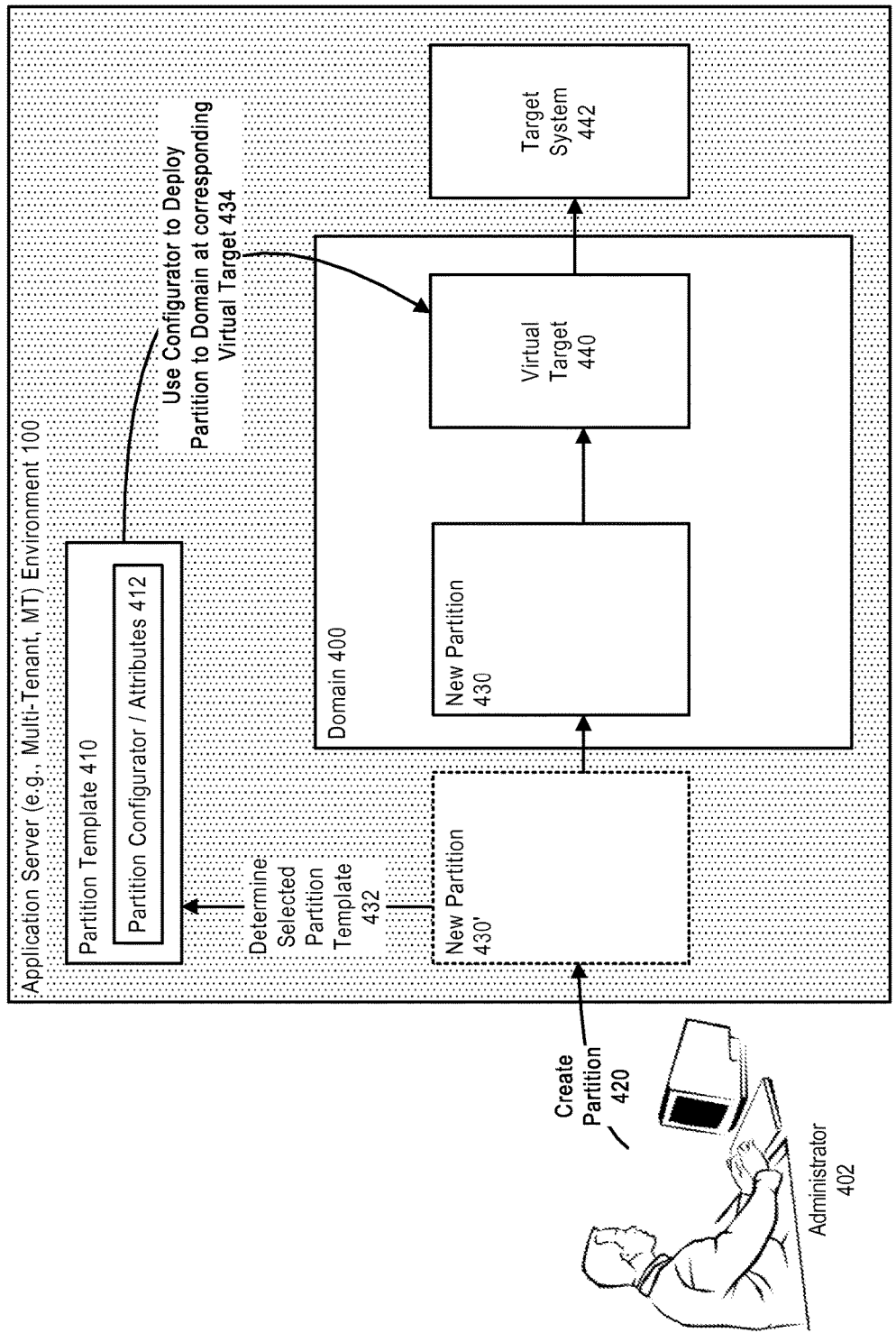
FIG. 6 illustrates the use of partition templates in an application server, cloud, or other environment, in accordance with an embodiment.

FIG. 6 illustrates the use of partition templates in an application server, cloud, or other environment, in accordance with an embodiment. As shown in FIG. 6, in accordance with an embodiment, a domain 400 is provided for execution of software applications, and one or more partitions and resource groups, wherein each partition provides an administrative and runtime subdivision of the domain.

An administrator 402 may wish to create new partitions for use with the domain. In accordance with an embodiment, a partition template 410, including a partition configurator and/or attributes 412, can be used to configure partitions deployed to the domain using that partition template.

In accordance with an embodiment, each partition template can be associated with a quality of service (QoS). For example, a "premium" or "gold" level partition template may be used to create partitions that have a higher QoS that a "standard" or "bronze" level partition template, due to having, e.g., different max thread count values, or other characteristics. Similarly, a partition created from a bronze template may be targeted to a small or slower cluster; while a partition created from a gold template may be targeted to a faster or larger cluster.

The labels such as "premium", "gold", "standard" and "bronze" as used herein are intended merely as labels, to reflect different types of partition templates. In accordance with various embodiments, different types of labels can be used.

When a request is received to create 420 a new partition 430, a selected partition template is determined 432. The partition configurator of that partition template is then used 434 to configure and deploy the partition to the domain at a corresponding virtual target 440, which in turn is associated with a target system 442 (e.g., a computer server, or a cluster).

If a partition template has a QoS, work manager, or fair share associated with that template, then that configuration information is used in creating the partition and associating it with an appropriate virtual target and target system. For example, the configurator can modify the targeting aspects associated with a particular partition, to e.g., create e.g., a "bronze" level cluster for use with a "bronze" level partition.

Figure 7:
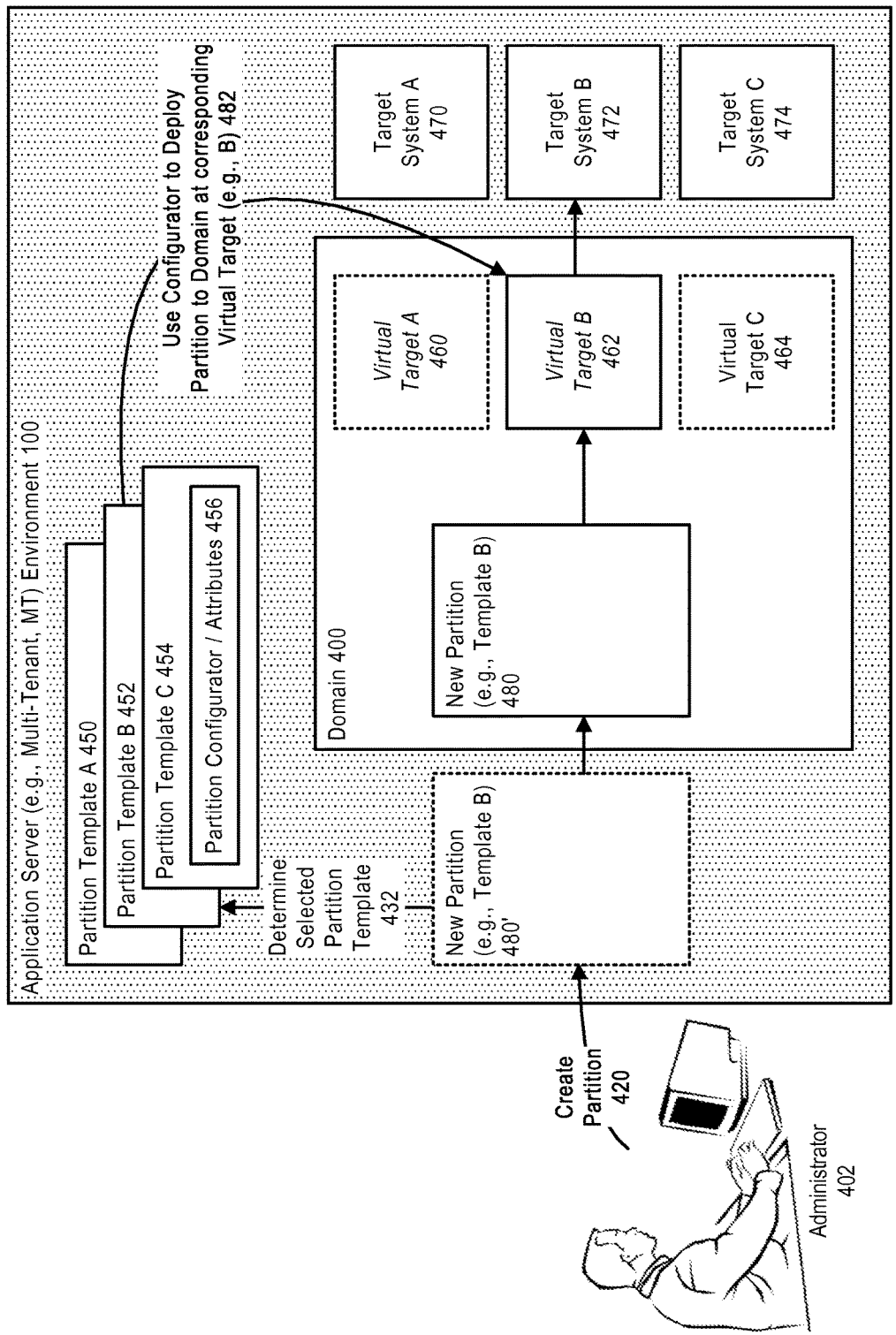
FIG. 7 further illustrates the use of partition templates in an application server, cloud, or other environment, in accordance with an embodiment.

FIG. 7 further illustrates the use of partition templates in an application server, cloud, or other environment, in accordance with an embodiment. As shown in FIG. 7, in accordance with an embodiment, when a plurality of partition templates are provided, such as partition templates A 450, B 452, C 454, each partition template can include its own partition configurator and/or attributes (e.g., 456), that can be used to configure partitions deployed to the domain using that partition template, including different configuration attributes for each partition template.

For example, a partition template A can be associated with configuration attributes that are used to deploy partitions to a virtual target A 460 associated with a target system A 470; while partition template B can be associated with configuration attributes that are used to deploy partitions to a virtual target B 462 associated with a target system B 472; and partition template C can be associated with configuration attributes that are used to deploy partitions to a virtual target C 464 associated with a target system C 474.

When a request is received to create a new partition 480, a selected partition template is determined from within the plurality of partition templates, and the partition configurator of that partition template is then used 482 to configure and deploy the partition to the domain at a corresponding virtual target (in this example, virtual target B associated with target system B).

Unlike a resource group template, a partition template is only used at the time of creating or defining a partition, and is not needed to be linked to the partition thereafter. For example, the use of partition to create, e.g., a "gold" level partition, does not prevent that same partition from being later reconfigured to be associated with a "bronze" level target.

Figure 8:
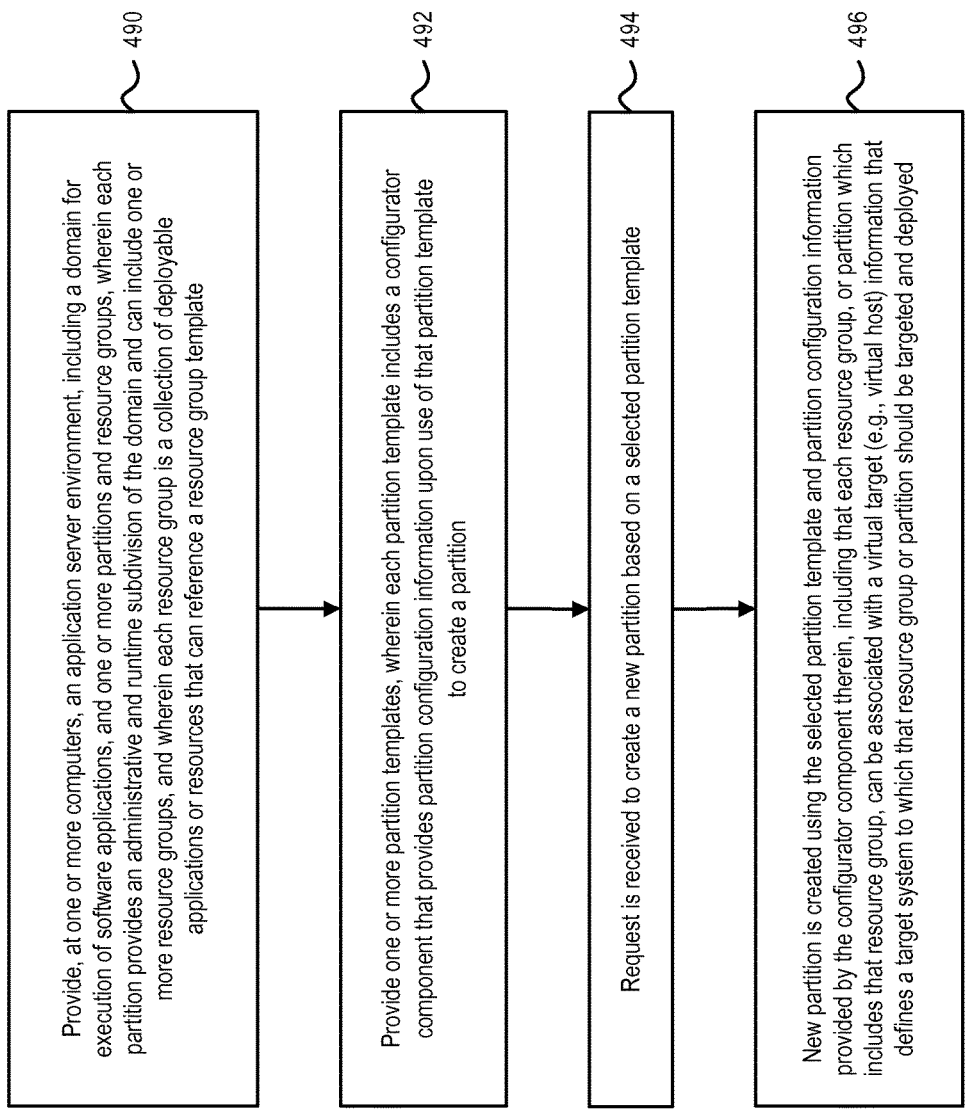
FIG. 8 illustrates a method of using partition templates in an application server, cloud, or other environment, in accordance with an embodiment.

FIG. 8 illustrates a method of using partition templates in an application server, cloud, or other environment, in accordance with an embodiment. As shown in FIG. 8, in accordance with an embodiment, at step 490, an application server environment is provided, including a domain for execution of software applications, and one or more partitions and resource groups, wherein each partition provides an administrative and runtime subdivision of the domain and can include one or more resource groups, and wherein each resource group is a collection of deployable applications or resources that can reference a resource group template.

At step 492, one or more partition templates are provided, wherein each partition template includes a configurator component that provides partition configuration information upon use of that partition template to create a partition.

At step 494, a request is received to create a new partition based on a selected partition template.

At step 496, the new partition is created using the selected partition template and partition configuration information provided by the configurator component therein, including that each resource group, or partition which includes that resource group, can be associated with a virtual target (e.g., virtual host) information that defines a target system to which that resource group or partition should be targeted and deployed.

Example Implementation

Additional details describing an exemplary embodiment are provided below for purposes of illustration.

Partition Templates and Quality of Service (QoS)

In accordance with an embodiment, a partition's QoS is determined by a number of factors—most of which are specified in the partition's configuration. It is important for an administrator to be able to easily manage these QoS configurations and easily create partitions from them. An administrator may also have other reasons for wanting to categorize partition configurations other than QoS. For example, they may want to customize a partition's configuration for a specific application and easily create those application specific partitions.

Characteristics of a Partition Template

A Partition Template is essentially a snapshot of a Partition, but there are some differences:

A partition template has no runtime manifestation.
A partition template can not be started, and is never running.
PartitionTemplatesMBean extends PartitionMBean, the shared part will be replicated on the created partitions.
Partitions can be created from a partition template.
When a partition is created from a partition template, the template's configuration is copied to create the new partition.

Using Partition Templates

As described above, in accordance with an embodiment, a partition can be created from a partition template. For example in a single edit session the WLS administrator: Creates a partition from the partition template; Optionally edits the partition to add or update the configuration (it is possible to have blank or missing attributes in the partition template which must be provided); and Saves the edit session.

Resource Groups in Partition Templates

In accordance with an embodiment, resource groups represent the way to assign/define/deploy resources within a partition, and can be "self-defined" inside a partition or can reference a resource group template. Resource group usage within partition templates will not trigger deployment of the resources defined in the resource group(s).

Partition Templates and Domain Templates

In accordance with an embodiment, a domain template can be created from an existing domain. Adding partition templates(s) to a domain is not different than any other domain configuration exercise. This could be done using the admin console, a WLST script or by editing the config.xml file manually.

Partition Work Manager Configuration

In accordance with an embodiment, the system administrator may prioritize the thread usage of the application server thread pool among the partitions using the Work Manager configuration for a partition.

TABLE 1

| Work Manager Config for Partition | Description | Unit | Range | Default |
|---|---|---|---|---|
| Fair Share Value | Numeric value that provides relative priority of work requests for partitions in a domain. Thread usage increases as the fair share value increases. The value is relative to other fair share values of partitions in a domain. | Relative numeric value | 1-1000 | 50 |
| Minimum Thread Constraint Limit | Limit on the Minimum Thread Constraint for each partition in a domain. A Minimum Thread Constraint guarantees the number of threads the server will allocate when there is no available thread in the pool. | Number of threads | 1-65536 | No limit set |
| Capacity Constraint | The maximum number of work requests from a partition that can be running or queued in any given point in time before work requests are rejected. | Number of work requests | 1-65536 | No constraint set |

For example, a system administrator may use the configurations illustrated in Table 1 to help define partition templates to have a relative priority to each other. For example, they may choose to define two partition templates, Premium and Standard, where the Premium partition has a higher priority than the Standard partition. The system administrator will decide which configurations will define the priority of a partition, for example by choosing to set any or none of the above Work Manager configurations for work requests and thread usage in a partition template. Table 2 illustrates an example of how the system administrator may define the Premium and Standard partition template using the Work Manager configuration:

TABLE 2

| Work Manager Config for Partition | Premium Partition Template | Standard Partition Template |
|---|---|---|
| Fair Share Value | 30 | 50 |
| Minimum Thread Constraint Limit | No limit set | 5 |
| Capacity Constraint | No constraint set | 3000 |

Partition Priority

While a partition's QoS can be impacted by a number of factors some WLS subsystems may need a simple mechanism to determine if one partition should be given a higher priority than another. In these cases the partition's Fair Share value can be used to determine a partition's priority. For example, the partition with the higher Fair Share value should be considered to have higher priority.

Partition Tagging

In accordance with an embodiment, partition templates can be labeled with a simple configuration tag such as "premium" or "standard". Any partition created from the template inherits (gets a copy of) these tags. Only the WLS administrator will be allowed to modify tags on a partition or partition template. In addition to providing a human readable label for a partition's QoS category these tags can also be used by other subsystems. For example, these partition tags could be used by a quota feature to support rules like: Tenant A can create unlimited "standard" partitions, but only 2 "premium" partitions.

Partition Name and ID Substitution

In accordance with an embodiment, when a partition is created from partition template Name for the partition must be provided and ID must be generated. It is possible to use ${partition.name} and ${partition.id} in any configuration field of the template and these special sequences will be substituted with name respective id in created partition.

Partition Templates Properties Example

In accordance with an embodiment, if part of a partition configuration is to define the partition host then one could imagine using partition properties to automatically generate a partition host name based on the partition name. For example:

host="${partition.name}.acme.com";

Partition Configurators

In its simplest form a partition template acts as a static template from which partitions can be created: it is a snippet of xml that is simply copied to be the configuration for the newly created partition. Partition Template Properties provide some flexibility, but a more dynamic model may be needed. Consider three partition templates: GoldTemplate, SilverTemplate and BronzeTemplate respectively targeted to GoldCluster, SilverCluster and BronzeCluster (assuming GoldCluster is on faster hardware than Silver, etc). Therefore a partition created from the GoldTemplate would be targeted to GoldCluster. This works, but it is generally a static form of matching. In accordance with an embodiment, by combining configuration tagging with template partition configurators a more dynamic model can be used, for example Configuration tags can be used to label config beans, so clusters can be labeled "gold", "silver" and "bronze"; while partition configurators contain runtime logic that can dynamically modify a partition's configuration based on input criteria (e.g., a provider's configuration).

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A system for supporting the use of partition templates in an application server environment, comprising:
    one or more computers, including an application server environment that enables deployment and execution of software applications, wherein the application server environment includes a domain configuration that is used at runtime to define a domain for execution of the software applications, one or more partitions, and one or more resource groups,
    wherein each partition, of the one or more partitions, is associated with a partition identifier and a partition configuration, and provides an administrative and runtime subdivision of the domain, and includes one or more resource groups, and
    wherein each resource group, of the one or more resource groups, is a collection of deployable applications or resources that are defined at domain or partition level; and
    at least one partition template, wherein each partition template, of the at least one partition template, is associated with a partition configurator, and is used to configure partitions deployed to the domain using that partition template, including that,
    when a request is received to create a new partition, a selected partition template, of the at least one partition template, is determined, and
    the partition configurator associated with the selected partition template is used to configure and deploy the new partition to the domain of the application server environment, at a corresponding virtual target associated with a target system, including providing a partition configuration for the new partition.

2. The system of claim 1, wherein the application server or a cloud environment includes a Java EE application server.

3. The system of claim 1, wherein the system is provided within a cloud environment, to support multiple tenants operating within the cloud environment, including that the system can optionally associate one or more partitions with a tenant, for use by the tenant.

4. The system of claim 1, wherein a resource group can selectively reference a resource group template.

5. The system of claim 1, wherein a partition can optionally define properties for configuration data not specified in a resource group template to which a resource group of the partition references, so that the partition operates as a binding of deployable resources defined in the resource group template, to specific values for use with the partition.

6. The system of claim 1, comprising a plurality of partition templates, wherein each partition template, of the plurality of partition templates, is used to configure partitions deployed to the domain, including different configuration attributes for each different partition template.

7. A method for supporting the use of partition templates in an application server environment, comprising:
    providing, at one or more computers, an application server environment that enables deployment and execution of software applications, wherein the application server environment includes a domain configuration that is used at runtime to define a domain for execution of the software applications, one or more partitions, and one or more resource groups,
    wherein each partition, of the one or more partitions, is associated with a partition identifier and a partition configuration, and provides an administrative and runtime subdivision of the domain, and includes one or more resource groups, and
    wherein each resource group, of the one or more resource groups, is a collection of deployable applications or resources that are defined at domain or partition level; and
    providing at least one partition template, wherein each partition template, of the at least one partition template, is associated with a partition configurator, and is used to configure partitions deployed to the domain using that partition template, including that,
    when a request is received to create a new partition, a selected partition template, of the at least one partition template, is determined, and
    the partition configurator associated with the selected partition template is used to configure and deploy the new partition to the domain of the application server environment, at a corresponding virtual target associated with a target system, including providing a partition configuration for the new partition.

8. The method of claim 7, wherein the application server or a cloud environment includes a Java EE application server.

9. The method of claim 7, wherein the method is performed within a cloud environment, to support multiple tenants operating within the cloud environment, including that the system can optionally associate one or more partitions with a tenant, for use by the tenant.

10. The method of claim 7, wherein a resource group can selectively reference a resource group template.

11. The method of claim 7, wherein a partition can optionally define properties for configuration data not specified in a resource group template to which a resource group of the partition references, so that the partition operates as a binding of deployable resources defined in the resource group template, to specific values for use with the partition.

12. The method of claim 7, comprising a plurality of partition templates, wherein each partition template, of the plurality of partition templates, is used to configure partitions deployed to the domain, including different configuration attributes for each different partition template.

13. A non-transitory computer readable storage medium, including instructions stored thereon which when read and executed by one or more computers cause the one or more computers to perform the steps comprising:
providing an application server environment that enables deployment and execution of software applications, wherein the application server environment includes a domain configuration that is used at runtime to define a domain for execution of the software applications, one or more partitions, and one or more resource groups,
wherein each partition, of the one or more partitions, is associated with a partition identifier and a partition configuration, and provides an administrative and runtime subdivision of the domain, and includes one or more resource groups, and
wherein each resource group, of the one or more resource groups, is a collection of deployable applications or resources that are defined at domain or partition level; and
providing at least one partition template, wherein each partition template, of the at least one partition template, is associated with a partition configurator, and is used to configure partitions deployed to the domain using that partition template, including that,
when a request is received to create a new partition, a selected partition template, of the at least one partition template, is determined, and
the partition configurator associated with the selected partition template is used to configure and deploy the new partition to the domain of the application server environment, at a corresponding virtual target associated with a target system, including providing a partition configuration for the new partition.

14. The non-transitory computer readable storage medium of claim 13, wherein the application server or a cloud environment includes a Java EE application server.

15. The non-transitory computer readable storage medium of claim 13, wherein the method is performed within a cloud environment, to support multiple tenants operating within the cloud environment, including that the system can optionally associate one or more partitions with a tenant, for use by the tenant.

16. The non-transitory computer readable storage medium of claim 13, wherein a partition can optionally define properties for configuration data not specified in a resource group template to which a resource group of the partition references, so that the partition operates as a binding of deployable resources defined in the resource group template, to specific values for use with the partition.

17. The non-transitory computer readable storage medium of claim 13, comprising a plurality of partition templates, wherein each partition template, of the plurality of partition templates, is used to configure partitions deployed to the domain, including different configuration attributes for each different partition template.

* * * * *

UNITED STATES PATENT AND TRADEMARK OFFICE
CERTIFICATE OF CORRECTION

PATENT NO. : 9,697,052 B2
APPLICATION NO. : 14/748142
DATED : July 4, 2017
INVENTOR(S) : Dipol et al.

It is certified that error appears in the above-identified patent and that said Letters Patent is hereby corrected as shown below:

On the Title Page

On page 2, Column 2, under Other Publications, Lines 9-10, delete "Partitioining" and insert -- Partitioning --, therefor.

In the Drawings

On sheet 4 of 8, in FIGURE 4, under Reference Numeral 286, Line 2, delete "medrec" and insert -- MedRec --, therefor.

In the Specification

In Column 12, Line 43, delete ".com";" and insert -- .com". --, therefor.

Signed and Sealed this
Tenth Day of April, 2018

Andrei Iancu
*Director of the United States Patent and Trademark Office*